(12) United States Patent
Westervelt et al.

(10) Patent No.: US 11,927,142 B2
(45) Date of Patent: Mar. 12, 2024

(54) SYSTEMS AND METHODS FOR CONTROLLING FUEL COKE FORMATION

(71) Applicant: General Electric Company, Schenectady, NY (US)

(72) Inventors: Eric R. Westervelt, Niskayuna, NY (US); Stefan Joseph Cafaro, Chapel Hill, NC (US); James R. Reepmeyer, Montgomery, OH (US); Arthur W. Sibbach, Boxford, MA (US); Constantinos Minas, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/872,241

(22) Filed: Jul. 25, 2022

(65) Prior Publication Data

US 2024/0026831 A1   Jan. 25, 2024

(51) Int. Cl.
*F02C 9/52* (2006.01)
*F02C 7/30* (2006.01)

(52) U.S. Cl.
CPC .............. *F02C 9/52* (2013.01); *F02C 7/30* (2013.01); *F05D 2260/606* (2013.01);
(Continued)

(58) Field of Classification Search
CPC .. F02C 7/141; F02C 7/185; F02C 9/52; F02C 7/222; F02C 7/224; F02C 7/228;
(Continued)

(56) References Cited

U.S. PATENT DOCUMENTS 3,039,305 A   6/1962 Hall
4,505,124 A   3/1985 Mayer
(Continued)

FOREIGN PATENT DOCUMENTS

CA   885178   11/1971
CN   1627063   6/2005
(Continued)

OTHER PUBLICATIONS https://web.archive.org/web/20090612100519/https://en.wikipedia.org/wiki/Hagen%E2%80%93Poiseuille_equation. 2009.*
(Continued)

*Primary Examiner* — Todd E Manahan
*Assistant Examiner* — Rodolphe Andre Chabreyrie
(74) *Attorney, Agent, or Firm* — Fitch, Even, Tabin & Flannery, LLP

(57) ABSTRACT

Systems and methods are disclosed for estimating or determining a rate or an amount of fuel coke formation in a fuel system, such as of a gas turbine engine. The system is operable to control a rate of fuel coke formation. The system may include a sensor that measures an operating parameter associated with fuel coke formation in the fuel system. A controller is in communication with the sensor to receive the signal therefrom for determining an amount or a rate of fuel coking in the fuel system. Based on this determination the controller may adjust the rate of fuel coke formation by adjusting the operation of the turbine engine, a thermal management system of the turbine engine, or the fuel system.

17 Claims, 9 Drawing Sheets

(52) U.S. Cl.
CPC ........... *F05D 2270/3015* (2013.01); *F05D 2270/303* (2013.01); *F05D 2270/306* (2013.01); *F05D 2270/804* (2013.01)

(58) Field of Classification Search
CPC .. F02C 7/232; F02C 7/236; F02C 9/28; F02C 7/22; F02C 7/30; F23D 2900/00016; F23N 5/203; F23N 1/002; F01D 21/003; F01D 17/085; F05D 2220/323; F05D 2260/213; F05D 2260/606; F05D 2260/80; F05D 2260/83
See application file for complete search history.

(56) References Cited

U.S. PATENT DOCUMENTS

| | | | |
|---|---|---|---|
| 4,756,854 A | 7/1988 | Wegrzyn | |
| 4,784,959 A | 11/1988 | Wegrzyn | |
| 4,822,743 A | 4/1989 | Wegrzyn | |
| 4,844,743 A | 7/1989 | Koblenzer | |
| 5,809,771 A | 9/1998 | Wernberg | |
| 6,116,016 A | 9/2000 | Wada | |
| 6,182,435 B1 | 2/2001 | Niggemann | |
| 6,415,595 B1 | 7/2002 | Wilmot, Jr. | |
| 6,877,306 B2 | 4/2005 | Wernberg | |
| 6,959,535 B2 | 11/2005 | Mancini | |
| 6,984,465 B2 | 1/2006 | Canepa | |
| 7,096,667 B2 | 8/2006 | Laster | |
| 7,192,459 B2 | 3/2007 | Puri | |
| 7,752,885 B2 | 7/2010 | Huang | |
| 7,811,688 B2 | 10/2010 | Flynn | |
| 7,915,047 B2 | 3/2011 | Thorn | |
| 8,113,708 B2 | 2/2012 | Albertson | |
| 8,319,833 B2 | 11/2012 | Weinstein | |
| 8,340,886 B2 | 12/2012 | Nenmeni | |
| 8,387,400 B2 | 3/2013 | Goeke | |
| 8,394,553 B2 | 3/2013 | Flynn | |
| 8,470,933 B2 | 6/2013 | Thorn | |
| 8,499,822 B2 | 8/2013 | Bulin | |
| 8,639,480 B2 | 1/2014 | Arnold | |
| 8,720,206 B2 | 5/2014 | McMahan | |
| 8,778,545 B2 | 7/2014 | Lehar | |
| 8,858,679 B2 | 10/2014 | Buhrman | |
| 9,022,730 B2 | 5/2015 | Vysohlid | |
| 9,038,397 B2 | 5/2015 | Papa | |
| 9,239,008 B2 | 1/2016 | Ekanayake | |
| 9,249,729 B2 | 2/2016 | Bacic | |
| 9,269,205 B1 | 2/2016 | Lamkin | |
| 9,318,757 B2 | 4/2016 | Koenig | |
| 9,561,856 B2 | 2/2017 | Mevenkamp | |
| 9,638,422 B2 | 5/2017 | Hall | |
| 9,650,955 B2 | 5/2017 | Sabelhaus | |
| 9,650,960 B2 | 5/2017 | Vertenoeuil | |
| 9,683,910 B2 | 6/2017 | Ekanayake | |
| 10,107,200 B2 | 10/2018 | Miller | |
| 10,112,486 B2 | 10/2018 | Ban | |
| 10,222,291 B2 | 3/2019 | Thompson | |
| 10,233,841 B2 | 3/2019 | Bintz | |
| 10,260,419 B2 | 4/2019 | Cerny | |
| 10,286,336 B2 | 5/2019 | Durward | |
| 10,286,408 B2 | 5/2019 | Lam | |
| 10,344,673 B2 | 7/2019 | Rambo | |
| 10,364,750 B2 | 7/2019 | Rambo | |
| 10,386,259 B2 | 8/2019 | Zhang | |
| 10,473,031 B2 | 11/2019 | Ellsworth | |
| 10,578,585 B1 | 3/2020 | Gerardi | |
| 10,584,616 B2 | 3/2020 | Moxon | |
| 10,584,635 B2 | 3/2020 | Armstrong | |
| 10,823,066 B2 | 11/2020 | Miller | |
| 11,073,169 B2 | 7/2021 | Thatte | |
| 11,125,165 B2 | 9/2021 | Niergarth | |
| 11,139,491 B2 | 10/2021 | Kwon | |
| 11,143,104 B2 | 10/2021 | Pal | |
| 11,261,792 B2 | 3/2022 | Niergarth | |
| 11,261,803 B2 | 3/2022 | McCambridge | |
| 11,359,554 B2 | 6/2022 | Patel | |
| 11,761,344 B1 | 9/2023 | Miller | |
| 2006/0257094 A1 | 11/2006 | McEvoy | |
| 2008/0154474 A1 | 6/2008 | Iasillo | |
| 2010/0212857 A1 | 8/2010 | Bulin | |
| 2012/0019254 A1 | 1/2012 | Zhang | |
| 2012/0026483 A1 | 2/2012 | Messerchmidt | |
| 2012/0192542 A1 | 8/2012 | Chillar | |
| 2013/0045449 A1 | 2/2013 | Thatcher | |
| 2013/0139897 A1 | 6/2013 | Kim | |
| 2015/0059353 A1 | 3/2015 | Asai | |
| 2015/0101419 A1 | 4/2015 | Hill | |
| 2015/0118014 A1 | 4/2015 | Elward | |
| 2015/0321767 A1 | 11/2015 | Kamath | |
| 2016/0076461 A1 | 3/2016 | Kawai | |
| 2016/0356224 A1* | 12/2016 | Farnum | F02C 7/22 |
| 2017/0167382 A1 | 6/2017 | Miller | |
| 2017/0217592 A1 | 8/2017 | Hinderliter | |
| 2018/0050811 A1 | 2/2018 | Niergarth | |
| 2019/0003386 A1 | 1/2019 | Stapp | |
| 2019/0153952 A1* | 5/2019 | Niergarth | F02C 7/14 |
| 2019/0203645 A1 | 7/2019 | Kleckler | |
| 2019/0218971 A1 | 7/2019 | Niergarth | |
| 2019/0277201 A1* | 9/2019 | Veilleux, Jr. | B64D 37/32 |
| 2020/0197834 A1* | 6/2020 | Ding | C10G 31/11 |
| 2020/0340881 A1 | 10/2020 | Hattori | |
| 2020/0348662 A1 | 11/2020 | Cella | |
| 2021/0148283 A1 | 5/2021 | Niergarth | |
| 2021/0172375 A1* | 6/2021 | Bosak | F04B 49/007 |
| 2021/0277796 A1 | 9/2021 | McCambridge | |
| 2021/0277838 A1 | 9/2021 | Patel | |
| 2023/0279784 A1 | 9/2023 | Sibbach | |
| 2023/0279817 A1 | 9/2023 | Sibbach | |

FOREIGN PATENT DOCUMENTS

| | | |
|---|---|---|
| CN | 200990131 | 12/2007 |
| DE | 102009031663 | 4/2010 |
| EP | 0527629 | 2/1993 |
| EP | 2535644 | 12/2012 |
| EP | 2559884 | 2/2013 |
| EP | 3124770 | 2/2017 |
| EP | 3199456 | 8/2017 |
| EP | 3805107 | 4/2021 |
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |
| JP | 2014025741 | 2/2014 |
| WO | 2011119338 | 9/2011 |

OTHER PUBLICATIONS

Drafts, Acoustic Wave Technology Sensors, Fierce Electronics, Oct. 2000, 17 Pages.

(56) References Cited

OTHER PUBLICATIONS

Fandino et al., Phase Behavior of (CO2 + H2) and (CO2+ N2) at Temperatures Between (218.15 and 303.15) Kat Pressures up to 15 MPa, International Journal of Greenhouse Gas Control, vol. 36, May 2015, 39 Pages.

Fehrm, Bjorn's Corner: The Challenges of Hydrogen. Part 29. Gas Turbine Heat Management, Mar. 19, 2021, 3 Pages. Accessed on-line at: https://leehamnews.com/2021/03/19/bjorns~corner~the~challengs~of~hydrogen~part~29~gas~turbine~heat~management/.

Gonzalez-Portillo, A New Concept in Thermal Engineering Optimization: The Pericritical Cycle with Multi-Heating and Its Application to Concentrating Solar Power, Sep. 2019, 233 Pages. (Abstract Only) Retrieved Mar. 7, 2022 from Weblink: https://oa.upm.es/56492/.

Goos et al., Phase Diagrams of CO2 and CO2—N2 Gas Mixtures and Their Application in Compression Processes, Energy Procedia, vol. 4, 2011, pp. 3778-3785.

Javed et al., Thermodynamic Speed of Sound Data for Liquid and Supercritical Alcohols, Journal of Chemical & Engineering Data, vol. 64, No. 3, 2019, pp. 1035-1044.

Ke et al., Detecting Phase Transitions in Supercritical Mixtures: An Enabling Tool for Greener Chemical Reactions, Proceedings of the Royal Society A, vol. 466, 2010, pp. 2799-2812.

Ke et al., The Phase Equilibrium and Density Studies of the Ternary Mixtures of CO2+ Ar+ N2 and CO2 + Ar+ H2, Systems Relevance to CCS Technology, International Journal of Greenhouse Gas Control, vol. 56, Jan. 2017, pp. 55-56.

Legoix et al., Phase Equilibria of the CH4—CO2 Binary and the CH4—CO2—H2O Ternary Mixtures in the Presence of a CO2-Rich Liquid Phase, 10122034, Energies, vol. 10, 2017, 11 Pages.

Oag et al., Probing the Vapor-Liquid Phase Behaviors of Near-Critical and Supercritical Fluids Using a Shear Mode Piezoelectric Sensor, Analytical Chemistry, vol. 75, No. 3, Feb. 1, 2003, p. 479-485.

Park et al., Measurements of Density and Sound Speed in Mixtures Relevant to Supercritical CO2 Cycles, Journal of Energy Resources Technology, vol. 142, Oct. 2020, 7 Pages.

U.S. Appl. No. 17/687,960; Notice of Allowance dated Jun. 28, 2023 (pp. 9).

Wetenhall et al., The Effect of CO2 Purity on the Development of Pipeline Networks for Carbon Capture and Storage Schemes, International Journal of Greenhouse Gas Control, vol. 30, 2014, pp. 197-211.

U.S. Appl. No. 17/687,960, filed Mar. 7, 2022, entitled "Pericritical Fluid Systems for Turbine Engines".

U.S. Appl. No. 17/687,976, filed Mar. 7, 2022, entitled "Liquid Fluid Systems for Turbine Engines".

U.S. Appl. No. 17/719,379, filed Apr. 13, 2022, entitled "Transient Control of a Thermal Transport Bus".

U.S. Appl. No. 17/719,379; Non-Final Office Action dated May 8, 2023.

U.S. Appl. No. 17/724,074, filed Apr. 19, 2022, entitled "Thermal Management System".

USPTO; U.S. Appl. No. 17/719,379; Notice of Allowance and Fees Due (PTOL-85) dated Dec. 5, 2023; (pp. 1-10).

\* cited by examiner

SYSTEMS AND METHODS FOR CONTROLLING FUEL COKE FORMATION

TECHNICAL FIELD

These teachings relate generally to turbine engines and more particularly to determining the amount, or the rate of, coke formation in a turbine engine fuel system and regulating the rate of coke formation.

BACKGROUND

Combustion turbines, such as those used for generating electric power or powering an aircraft, are often fueled by liquid hydrocarbon fuel. The liquid hydrocarbon fuel is stored in a liquid fuel supply system, which includes an arrangement of pipes and valves and is filled with liquid fuel for use when necessary or desired. Combustion of the fuel produces high temperatures in the combustion chamber of the engine The combination of liquid hydrocarbon fuel, which inherently includes dissolved oxygen, and high temperatures in the liquid fuel supply system causes oxidation and partial decomposition of the liquid fuel in the liquid fuel supply system and produces coke. This process is referred to as "coking," and the coke forms as hard deposits on surfaces in the liquid fuel supply system. These deposits can constrict or clog components of the fuel supply system, such as valves, nozzles, and valve screens of the fuel system. Excessive coking can interfere with effective liquid fuel transfer through the liquid fuel supply system and, at times, can require the combustion turbine to be shut down for cleaning of the liquid fuel supply system or replacement of its affected components.

Accordingly, determining or estimating the coke formation in a liquid fuel supply system of a combustion turbine, as well as controlling the rate of such coke formation, is desirable.

BRIEF DESCRIPTION OF THE DRAWINGS

Systems and methods for determining and/or controlling the rate of fuel coke formation in a combustion turbine are described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
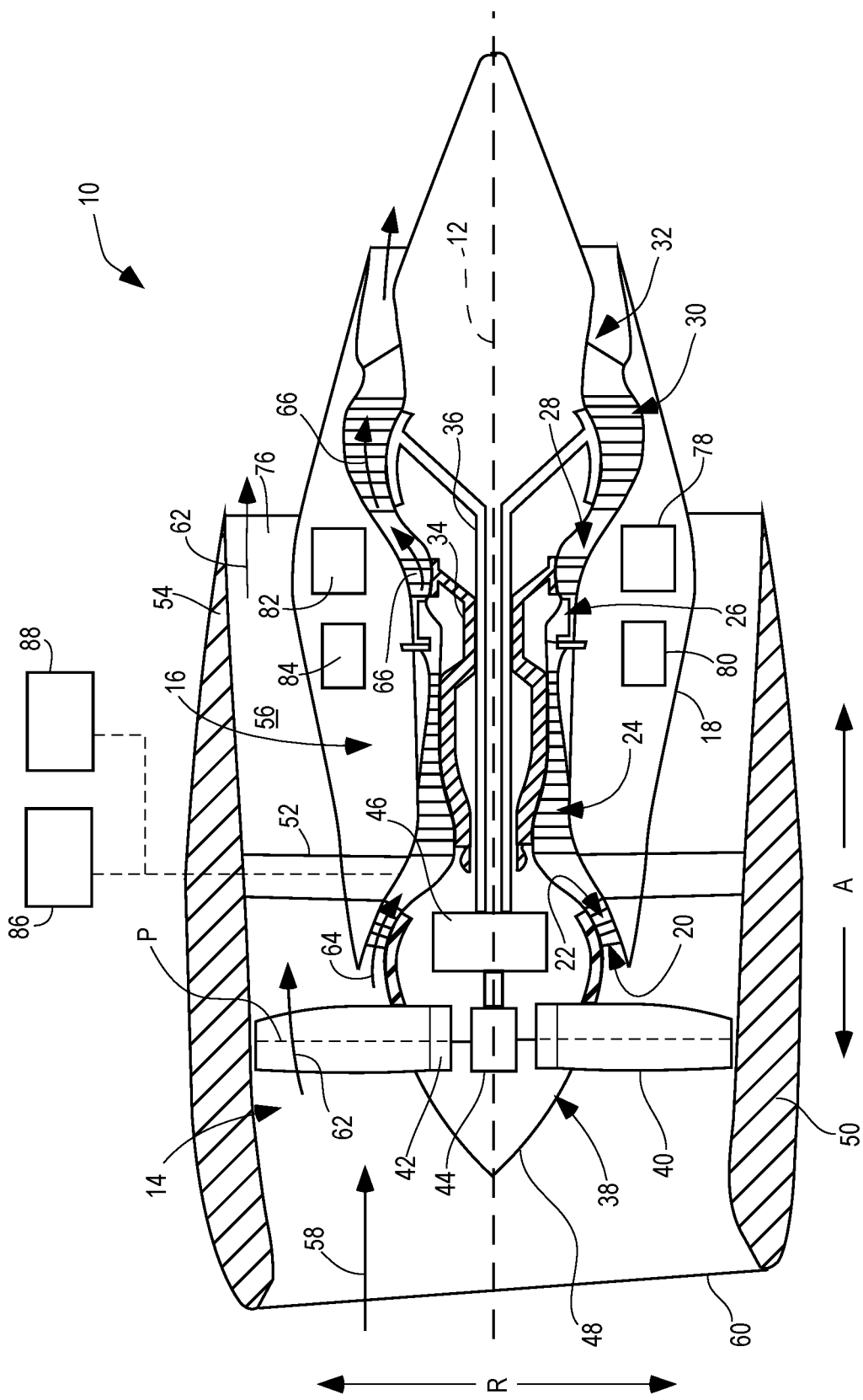
FIG. 1 is a schematic, cross-sectional view of a gas turbine engine in accordance with an exemplary embodiment of the present disclosure.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein. The term "HX" refers to a heat exchanger.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Aspects and advantages of the invention will be set forth in part in the following description, or may be obvious from the description, or may be learned through practice of the invention.

In one exemplary embodiment of the present disclosure, a system for controlling the rate of fuel coke formation in a fuel system is disclosed. The system includes a controller operable for determining or estimating the amount of fuel coke formation in the fuel system, and/or the rate at which fuel coke is being formed in the fuel system. By determining the amount of fuel coke formed in the fuel system or the rate at which fuel coke is being deposited in the fuel system, the controller can adjust the operation of the engine, a thermal management system of the engine, and/or the fuel system of the engine to raise or lower the rate of coke formation in the fuel system. For example, a temperature of the fuel in the fuel system may be lowered to decrease the rate of coke formation, or the amount of fuel delivered to a fuel deoxygenation system may be increased to lower the amount of oxygen in the fuel to reduce the rate of coke formation. While some adjustments to the operation of the engine, its thermal management system, or fuel system may affect performance or efficiency of the engine, the system can advantageously increase the intervals between required maintenance, such as an automated or manual coking deposit removal process or component replacement, by temporarily reducing fuel coking rates in the fuel system as needed or demanded, or in accordance with a maintenance schedule.

A thermal management system for incorporation at least partially into at least one of a gas turbine engine or an aircraft is disclosed herein. The thermal management system includes a thermal transport bus having a heat exchange fluid flowing therethrough and a pump for generating a flow of the heat exchange fluid in the thermal transport bus.

The thermal management system also includes a plurality of heat source exchangers in thermal communication with the heat exchange fluid in the thermal transport bus. The plurality of heat source exchangers are arranged along the thermal transport bus.

The thermal management system also includes at least one heat sink exchanger permanently or selectively in thermal communication with the heat exchange fluid in the thermal transport bus at a location downstream of the plurality of heat source exchangers. The at least one heat sink exchanger may include a fuel heat exchanger for controlling the temperature of fuel in the fuel system.

In another exemplary embodiment of the present disclosure, a gas turbine engine is provided. The gas turbine engine includes a compressor section coupled to a turbine section by one or more shafts and a main lubrication system for providing lubrication to one or more components located in at least one of the compressor section or the turbine section. The gas turbine engine also includes a thermal management system having a thermal transport bus having a heat exchange fluid flowing therethrough and a plurality of heat source exchangers in thermal communication with the heat exchange fluid in the thermal transport bus. The plurality of heat source exchangers are arranged along the thermal transport bus and include a heat exchanger for transferring heat from the main lubrication system to the heat exchange fluid in the thermal transport bus. The thermal management system also includes at least one heat sink exchanger permanently or selectively in thermal communication with the heat exchange fluid in the thermal transport bus at a location downstream of the plurality of heat source exchangers.

Referring now to the drawings, wherein identical numerals indicate the same elements throughout the figures, FIG. 1 is a schematic, cross-sectional view of a turbomachine, and more specifically, a gas turbine engine, in accordance with an exemplary embodiment of the present disclosure. More particularly, for the embodiment of FIG. 1, the gas turbine engine is a high-bypass turbofan jet engine, referred to herein as "turbofan jet engine 10." As shown in FIG. 1, the turbofan jet engine 10 defines an axial direction A (extending parallel to a longitudinal centerline 12 provided for reference) and a radial direction R. In general, the turbofan jet engine 10 includes a fan section 14 and a core turbine engine 16 disposed downstream from the fan section 14.

The core turbine engine 16 depicted generally includes a substantially tubular outer casing 18 that defines an annular inlet 20. The tubular outer casing 18 encases, in serial flow relationship, a compressor section including a booster or low-pressure compressor 22 and a high-pressure compressor 24; a combustion section 26; a turbine section including a high-pressure turbine 28 and a low-pressure turbine 30; and a jet exhaust nozzle section 32. A high-pressure spool 34 drivingly connects the high-pressure turbine 28 to the high-pressure compressor 24. A low-pressure spool 36 drivingly connects the low-pressure turbine 30 to the low-pressure compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to an actuation member 44 configured to collectively vary the pitch of the fan blades 40 in unison. The fan blades 40, disk 42, and actuation member 44 are together rotatable about the longitudinal centerline 12 by low pressure spool 36 across a power gear box 46. The power gear box 46 includes a plurality of gears for stepping down the rotational speed of the low-pressure spool 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially-spaced outlet guide vanes 52. Moreover, a downstream section 54 of the outer nacelle 50 may extend over an outer portion of the core turbine engine 16 so as to define a bypass airflow passage 56 therebetween.

During operation of the turbofan jet engine 10, a volume of air 58 enters the turbofan jet engine 10 through an associated inlet 60 of the outer nacelle 50 and/or fan section 14. As the volume of air 58 passes across the fan blades 40, a first portion 62 of the air 58 as indicated by an arrow is directed or routed into the bypass airflow passage 56 and a second portion 64 of the air 58 as indicated by an arrow is directed or routed into the low-pressure compressor 22. The ratio between the first portion 62 of air 58 and the second portion 64 of air 58 is commonly known as a bypass ratio. The pressure of the second portion 64 of air 58 is then increased as it is routed through the high-pressure compressor 24 and into the combustion section 26, where it is mixed with fuel and burned to provide combustion gases 66. Subsequently, the combustion gases 66 are routed through the high-pressure turbine 28 and the low-pressure turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass airflow passage 56 before it is exhausted from a fan nozzle exhaust section 76 of the turbofan jet engine 10, also providing propulsive thrust.

Moreover, as is depicted schematically, the turbofan jet engine 10 further includes various accessory systems to aid in the operation of the turbofan jet engine 10 and/or an aircraft including the turbofan jet engine 10. For example, the turbofan jet engine 10 further includes a main lubrication system 78 configured to provide a lubricant to, e.g., various bearings and gear meshes in the compressor section (including the low-pressure compressor 22 and high pressure compressor 24), the turbine section (including the high pressure turbine 28 and the low pressure turbine 30), the high pressure spool 34, the low pressure spool 36, and the power gear box 46. The lubricant provided by the main lubrication system 78 may increase the useful life of such components and may remove a certain amount of heat from such components. Additionally, the turbofan jet engine 10 includes a compressor cooling air (CCA) system 80 for providing air from one or both of the high-pressure compressor 24 or low-pressure compressor 22 to one or both of the high-pressure turbine 28 or low pressure turbine 30. Moreover, the turbofan jet engine 10 includes an active thermal clearance control (ACC) system 82 for cooling a casing of the turbine section to maintain a clearance between the various turbine rotor blades and the turbine casing within a desired range throughout various engine operating conditions. Furthermore, the turbofan jet engine 10 includes a generator lubrication system 84 for providing lubrication to an electronic generator, as well as cooling/heat removal for the electronic generator. The electronic generator may provide electrical power to, e.g., a startup electric motor for the turbofan jet engine 10 and/or various other electronic components of the turbofan jet engine 10 and/or an aircraft including the turbofan jet engine 10.

As is also depicted schematically, the turbofan jet engine 10 drives or enables various other accessory systems for an aircraft including the turbofan jet engine 10. For example, the turbofan jet engine 10 provides compressed air from the compressor section to an environmental control system (ECS) 86. The ECS 86 may provide an air supply to a cabin of the aircraft for pressurization and thermal control. Additionally, air may be provided from the turbofan jet engine 10 to an electronics cooling system 88 for maintaining a temperature of certain electronic components of the turbofan jet engine 10 and/or aircraft within a desired range.

It should be appreciated, however, that the turbofan jet engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan jet engine 10 may instead be any other suitable aeronautical gas turbine engine, such as a turbojet engine, turboshaft engine, turboprop engine, etc. Additionally, in still other exemplary embodiments, the turbofan jet engine 10 may include or be operably connected to any other suitable accessory systems. Additionally, or alternatively, the turbofan jet engine 10 may not include or be operably connected to one or more of the accessory systems discussed above.

Figure 2:
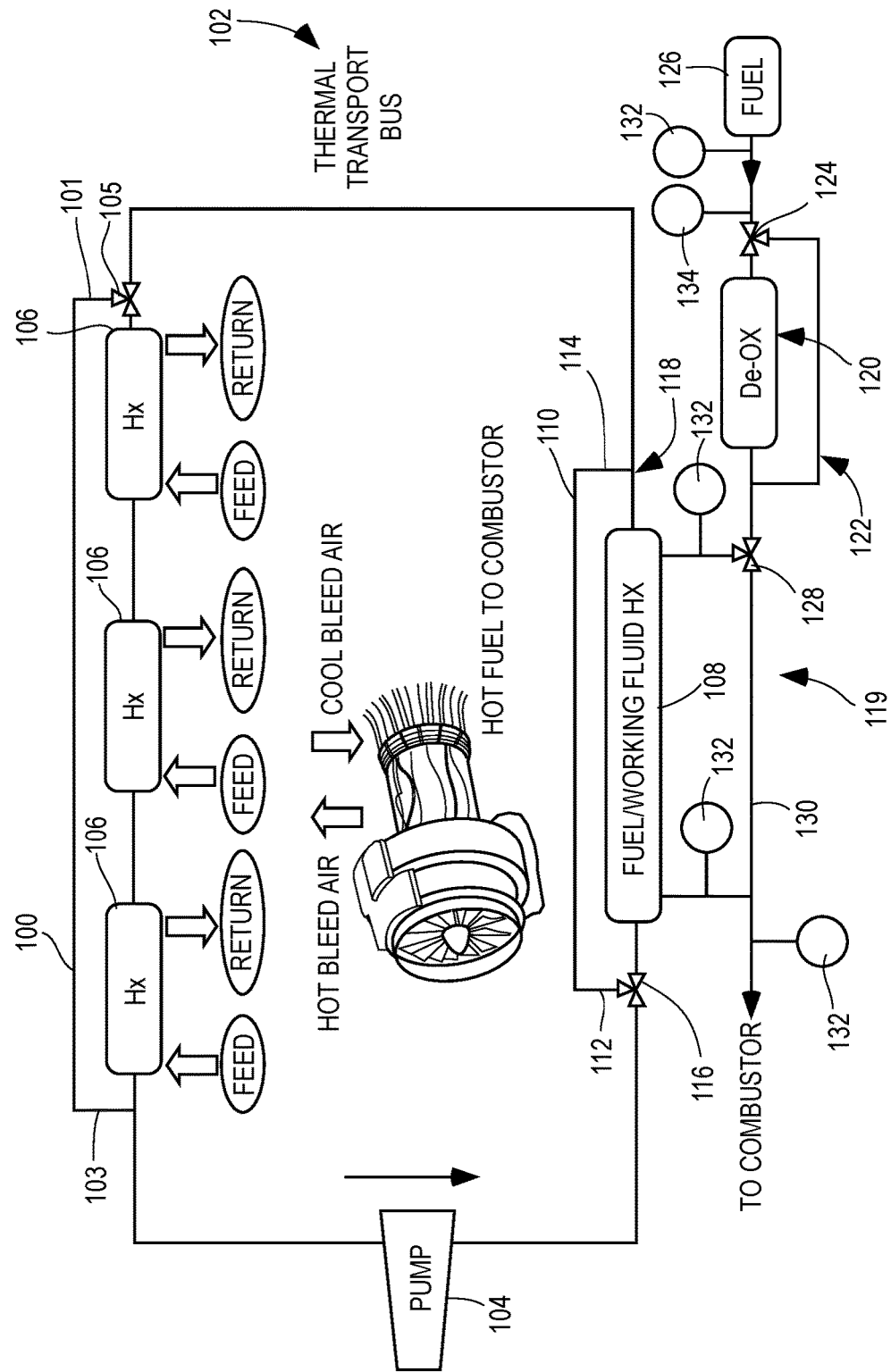
FIG. 2 comprises a thermal transport bus flow diagram as configured in accordance with various embodiments of these teachings.

As shown in FIG. 2, a thermal management system including thermal transport bus 102 includes an intermediary heat exchange fluid flowing therethrough and may be formed of one or more suitable fluid conduits. The heat exchange fluid may be an incompressible fluid having a high temperature operating range. For example, in certain embodiments, heat exchange fluid may be a water and ethanol mixture, supercritical CO2, oil, or any suitable fluid. A pump 104 is provided in fluid communication with the heat exchange fluid in the thermal transport bus 102 for generating a flow of the heat exchange fluid in the thermal transport bus 102. As viewed in FIG. 2, the pump 104 may generate a flow of the heat exchange fluid generally in a counterclockwise direction through the thermal transport bus 102. The pump 104 may be a rotary pump including an impeller, or alternatively may be any other suitable fluid pump. Additionally, the pump 104 may be powered by an electric motor, or alternatively may be in mechanical communication with and powered by, e.g., the high-pressure spool 34 or the low-pressure spool 36 of the turbofan jet engine 10. The speed of the pump 104 may be controlled by a controller 904 to control the flow rate of the heat exchange fluid through the thermal transport bus 102. For example, by increasing the pump speed and flow of heat exchange fluid, the heat transferred to the fuel in the heat sink exchanger 108 can be increased.

The thermal transport bus 102 includes a plurality of heat source exchangers 106 in thermal communication with the heat exchange fluid in the thermal transport bus 102. The plurality of heat source exchangers 106 are configured to transfer heat from the turbofan jet engine 10 to the heat exchange fluid in the thermal transport bus 102. In certain embodiments, the plurality of heat source exchangers 106 are configured to manage overall heat rejection and heat transfer throughout the engine to optimize performance and protect operating constraints. The term "heat rejection" means heat transfer from a hot medium to a cold medium.

For the embodiment depicted, there are three heat source exchangers 106, the three heat source exchangers 106 each arranged in series flow along the thermal transport bus 102. However, in other exemplary embodiments, any other suitable number of heat source exchangers 106 may be included and one or more of the heat source exchangers 106 may be arranged in parallel flow along the thermal transport bus 102. For example, in other embodiments, there may only be at least two heat source exchangers 106 in thermal communication with the heat exchange fluid in the thermal transport bus 102, or alternatively, there may be at least four heat source exchangers 106, at least five heat source exchangers 106, or at least six heat source exchangers 106 in thermal communication with heat exchange fluid in the thermal transport bus 102.

The plurality of heat source exchangers 106 depicted in the example of FIG. 2 are selectively in thermal communication with the heat exchange fluid in the thermal transport bus 102. More particularly, the thermal transport bus 102 includes one or more bypass lines 100 for selectively bypassing each of the plurality of heat source exchangers 106 (or more than one, or all of the plurality of heat source exchangers 106, as illustrated in FIG. 2). Each of the bypass lines 100 extends between an upstream juncture 101 and a downstream juncture 103—the upstream juncture 101 located just upstream of a respective heat source exchanger 106, and the downstream juncture 103 located just downstream of the respective heat source exchanger 106. Additionally, each of the bypass lines 100 meets at the respective upstream juncture 101 of the thermal transport bus 102 via a three-way heat source control valve 105. The three-way heat source control valves 105 each include an inlet fluidically connected with the thermal transport bus 102, a first outlet fluidically connected with the thermal transport bus 102, and a second outlet fluidically connected with the bypass lines 100. The three-way heat source control valves 105 may each be a variable throughput three-way valve, such that the three-way heat source control valves 105 may be controlled by a controller 904 to vary a throughput from the inlet to the first and/or second outlets. For example, the three-way heat source control valves 105 may be configured for providing anywhere between zero percent (0%) and one hundred percent (100%) of the heat exchange fluid from the inlet to the first outlet, and similarly, the three-way heat source control valves 105 may be configured for providing anywhere between zero percent (0%) and one hundred percent (100%) of the heat exchange fluid from the inlet to the second outlet.

Additionally, the thermal transport bus 102 of FIG. 2 further includes at least one heat sink exchanger 108 permanently or selectively in thermal communication with the heat exchange fluid in the thermal transport bus 102. The at least one heat sink exchanger 108 is located downstream of the plurality of heat source exchangers 106 and is configured for transferring heat from the heat exchange fluid in the thermal transport bus 102, e.g., to atmosphere, to fuel, to a fan stream, etc. For example, in certain embodiments the at least one heat sink exchanger 108 may include at least one of a RAM heat exchanger, a fuel heat exchanger (also called "fuel HX"), a fan stream heat exchanger, or a bleed air heat exchanger. The RAM heat exchanger may be configured as an "air to heat exchange fluid" heat exchanger integrated into one or both of the turbofan jet engine 10 and an aircraft including the turbofan jet engine 10. During operation, the RAM heat exchanger may remove heat from any heat exchange fluid therein by flowing a certain amount of RAM air over the RAM heat exchanger. Additionally, the fuel heat exchanger is a "fluid to heat exchange fluid" heat exchanger wherein heat from the heat exchange fluid is transferred to a stream of liquid fuel for the turbofan jet engine 10. Moreover, the fan stream heat exchanger is generally an "air to heat exchange fluid" heat exchanger which flows, e.g., bypass air over heat exchange fluid to remove heat from the heat exchange fluid. Further, the bleed air heat exchanger is generally an "air to heat exchange fluid" heat exchanger which flows, e.g., bleed air from the low-pressure compressor to the heat exchange fluid to remove heat from the heat exchange fluid.

For the embodiment depicted in FIG. 2, the at least one heat sink exchanger 108 of the thermal transport bus 102 includes an individual heat sink exchanger 108 serving as a fuel heat exchanger. However, in other exemplary embodiments, the at least one heat sink exchanger 108 may include any other suitable number of heat sink exchangers 108. For example, in other exemplary embodiments, a single heat sink exchanger 108 may be provided, at least two heat sink exchangers 108 may be provided, at least three heat sink exchangers 108 may be provided, at least four heat sink exchangers 108 may be provided, or at least five heat sink exchangers 108 may be provided. Additionally, in still other exemplary embodiments, two or more of the at least one heat sink exchangers 108 may alternatively be arranged in parallel flow with one another.

The at least one heat sink exchanger 108 depicted is selectively in thermal communication with the heat exchange fluid in the thermal transport bus 102. More particularly, the thermal transport bus 102 depicted includes at least one bypass line 110 for selectively bypassing each heat sink exchanger 108 of the plurality of heat sink exchangers 108. Each of the bypass lines 110 extends between a second upstream juncture 112 and a second downstream juncture 114—the second upstream juncture 112 located just upstream of a respective heat sink exchanger 108, and the second downstream juncture 114 located just downstream of the respective heat sink exchanger 108. Additionally, each of the bypass lines 110 meets at the respective second upstream juncture 112 with the thermal transport bus 102 via a three-way heat sink control valve 116. The three-way heat sink control valves 116 each include an inlet fluidically connected with the thermal transport bus 102, a first outlet fluidically connected with the thermal transport bus 102, and a second outlet fluidically connected with the bypass lines 110. The three-way heat sink control valves 116 may each be a variable throughput three-way valve, such that the three-way heat sink control valves 116 may be caused by a controller 904 to vary a throughput from the inlet to the first and/or second outlets. For example, the three-way heat sink control valves 116 may be configured for providing anywhere between zero percent (0%) and one hundred percent (100%) of the heat exchange fluid from the inlet to the first outlet, and similarly, the three-way heat sink control valves 116 may be configured for providing anywhere between zero percent (0%) and one hundred percent (100%) of the heat exchange fluid from the inlet to the second outlet.

The three-way heat sink control valves 116 may be in operable communication with a controller 904 of the turbofan jet engine 10 and/or of an aircraft including the turbofan jet engine 10. The controller 904 may cause the three-way heat sink control valve or valves 116 to cause the heat exchange fluid to partially or completely bypass one or more of the at least one heat sink exchangers 108 based on, e.g., an operating condition of the turbofan jet engine and/or aircraft, a temperature of the heat exchange fluid or fuel, and/or any other suitable variables. Alternatively, the controller 904 may control the heat sink control valve or valves 116 to cause the heat exchange fluid to bypass one or more of the at least one heat sink exchangers 108 based on a user input.

Further, each of the bypass lines 110 also meets at the respective second downstream juncture 114 with the thermal transport bus 102. Between each heat sink exchanger 108 and second downstream juncture 114, the thermal transport bus 102 includes a check valve 118 for ensuring a proper flow direction of the heat exchange fluid. More particularly, the check valve 118 prevents a flow of heat exchange fluid from the second downstream juncture 114 towards the respective heat sink exchanger 108. Although not shown, check valves may be located at similar locations throughout the thermal transport bus 102 and fuel system 119 to ensure proper flow of the heat exchange fluid and fuel, respectively.

As shown in FIG. 2, a fuel system 119 includes a fuel source 126, such as a fuel tank or fuel inlet. Fuel is directed from the fuel source 126 to a three-way fuel deoxygenation system ("FOX") control valve 124 and to either a fuel deoxygenation system 120 or a FOX bypass line or lines 122 which bypasses the fuel deoxygenation system 120. The amount of fuel going through the fuel deoxygenation system 120 versus the FOX bypass line or lines 122 is controlled through adjustment of the three-way FOX control valve 124, which may be controlled by controller 904. In addition, the fuel deoxygenation system 120 may be controlled by controller 904 to vary the amount of oxygen removed from the fuel. This allows for the rate of the deoxygenation process to be controlled. Thus, the amount of oxygen in the fuel can be manipulated to control the rate of coke formation in the fuel system 119. After passing through or bypassing the fuel deoxygenation system 120, the fuel is then routed by another three-way control valve 128 to the at least one heat sink exchanger 108 or a heat sink exchanger bypass line 130, i.e., a fuel heat exchanger bypass line, for controlling the amount of fuel flow to the heat sink exchanger 108 and thereby controlling the temperature of the fuel. The control valve 128 may be controlled by controller 904. After passing through the heat sink exchanger 108 or heat sink exchanger bypass line 130, the fuel then is directed to the combustor of the jet engine 10.

Various sensors 132 may be utilized for detecting or estimating coking within the fuel system 119. These sensors may include optical or position sensors for optically detecting the presence of coking deposits within the fuel system 119, pressure sensors for detecting the pressure at multiple locations within the fuel system, flow sensors, and temperature sensors for measuring the temperature of the fuel. The number, type, and location of sensors 132 may be adapted depending on the application and level of precision desired in detecting coking within the fuel system 119. In one form, one or more sensors 132 may be positioned at locations throughout the fuel system 119, such as in each leg of the fuel system and/or adjacent to components that are most susceptible to coking, such as components with small orifices, such as fuel nozzles, heat exchangers, filters, torque motors, servo-valves, and fuel cooled electronics housings. For example, as shown in FIG. 2, a pressure sensor may be positioned upstream and downstream of heat sink exchanger 108 for determining the pressure drop through the fuel side of the heat sink exchanger 108, from which the amount or rate of coking within the heat sink exchanger 108 can be determined. In another example, a more general system-wide coking level or rate can be determined by positioning pressure sensors 132 at either end of the fuel system 119, such as at the fuel source 126 and before the combustor to determine the pressure drop across all or a portion of the fuel system 119. Temperature sensors can also be used to estimate the amount of coking or rate of coking within the fuel system. For example, coking rates for various fuel types with respect to fuel temperature, residence time of the fuel, number of hot shutdowns of the engine and the temperature at which the engine was shut down, material (e.g., stainless steel or copper) in contact with the fuel, etc. are known and can be used to estimate the coking rate within the fuel system 119. Although sensors 132 are shown at only four locations in FIG. 2, it is understood that one or more sensors 132 may be present at each leg, juncture, and component of the fuel system 119.

Notably, the configuration shown in FIG. 2 allows for utilization of the fuel heat exchanger 108 without risk of heating the fuel to a point where deoxygenation systems are required to be utilized or even included. For example, prior fuel heat exchangers run the risk of fuel coking or deposit formation within the fuel system 119 when a temperature of the fuel is increased past a predetermined temperature threshold (thus requiring the deoxygenation systems). The fuel deoxygenation system 120 is configured to remove oxygen from the fuel and thereby generate and supply deoxygenated fuel. Due to the redundant and selective configuration of the various heat sink exchangers 108 for the embodiment depicted, however, utilization of the fuel heat exchanger may be ceased prior to the fuel reaching such a predetermined temperature threshold.

It should be appreciated, however, that the thermal transport bus 102 is provided by way of example only, and that in other exemplary embodiments, the thermal transport bus 102 may be configured in any other suitable manner.

Figure 3:
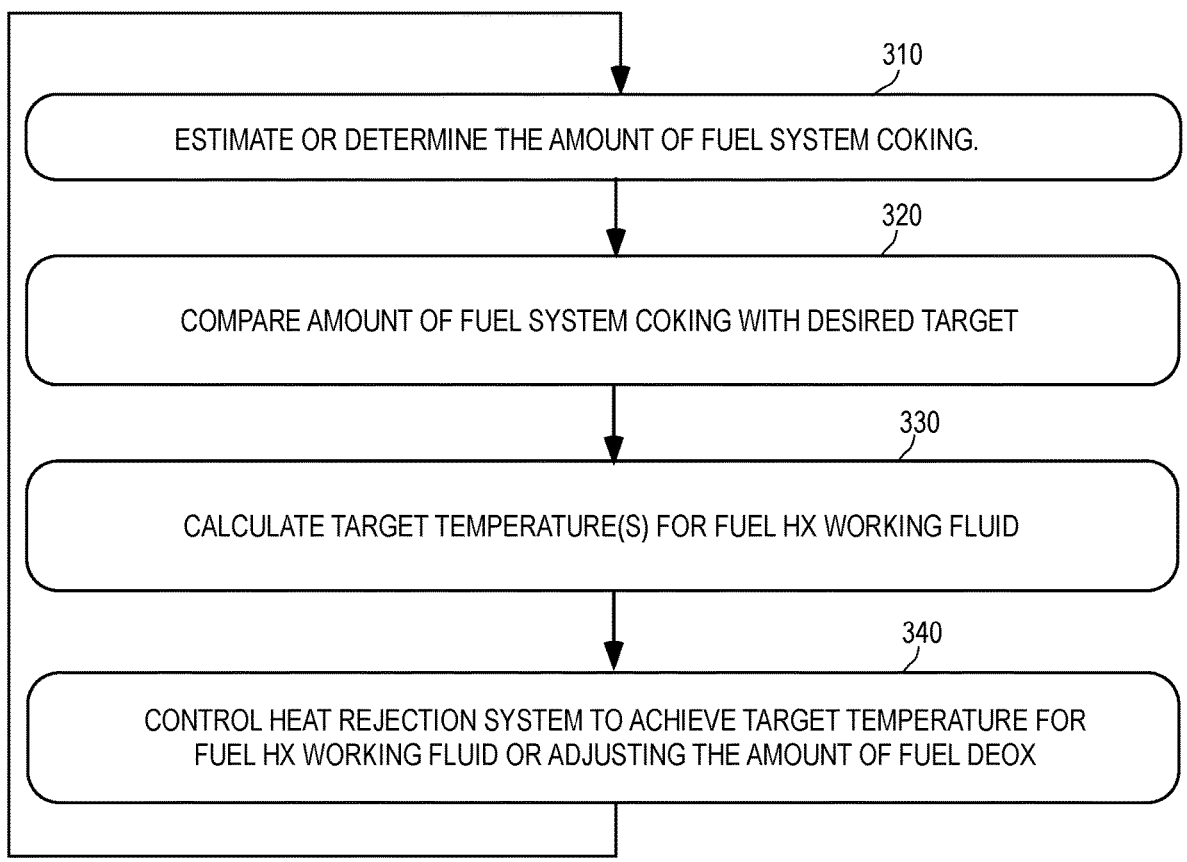
FIG. 3 is a flowchart of an exemplary process of controlling the rate of fuel coke formation.
Figure 8:
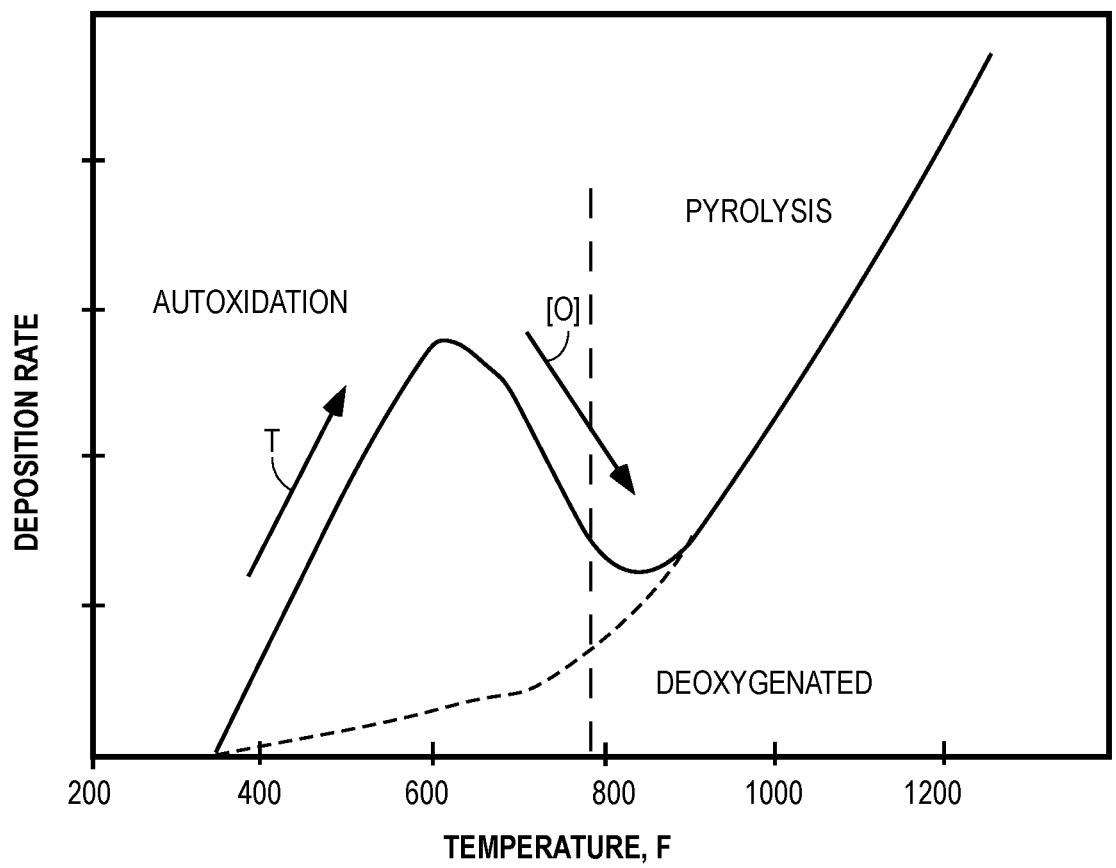
FIG. 8 is a graph illustrating fuel coke formation rate as a function of temperature.

FIG. 3 is a flowchart of an exemplary process of determining and controlling the amount of fuel system coking. At first step 310, the fuel system coking is measured and/or estimated. The fuel system coking may be measured optically or with a position sensor, or estimated through one or more of the following parameters, such as the pressure drop across the fuel system 119 or a component or components thereof, compressor discharge pressure (P3), metered fuel flow (WFM), fuel system static pressure, delta pressure via strain gage, static fuel temperatures specific fuel properties and fuel type (e.g., Jet-A, Sustainable Aviation Fuel ("SAF") (types 1-7), Power to Liquid fuel ("PtL"), etc.), fuel temperature, number of hot shutdowns of the jet engine 10, the temperature of each hot shutdown, and the materials used in the fuel system 119 that are in contact with the fuel. Specific fuel properties can be derived from the fuel's region of origin. In certain embodiments, data gathered from one or more sensors 132 are used by a controller 904 to determine or estimate the amount of fuel system coking. At step 320, the controller 904 compares the amount of fuel system coking measured or estimated with the desired coking target level. The coking target level may be selected based on what the fuel system 119 can tolerate without adversely affecting performance based on the geometry of critical orifices, such as small orifices or passages within the fuel system 119, current coking within the fuel system 119, current and expected operation of the jet engine 10, and an expected maintenance schedule wherein coking deposits will be removed from the fuel system 119. In certain embodiments, the desired coking target level is calculated based on at least one of fuel type, fuel temperature, and materials used inside the combustion engine fuel system 119. At step 330, the controller 904 calculates a target temperature for the fuel heat exchanger working fluid required to obtain the desired coking target level within a predetermined period of time. In certain embodiments, the target temperature for fuel heat exchanger working fluid is calculated based on at least one of desired fuel temperature, fuel type and materials used inside the combustion engine fuel system 119. At step 340, the controller 904 controls the thermal management system and/or the fuel system 119 to achieve the target temperature for fuel heat exchanger working fluid and/or the fuel. For example, pump speed can be adjusted, control valves 105, 116 may be controlled to adjust the flow of heat exchanger working fluid through heat exchangers 106 or 108 and control valve 128 may be controlled to adjust the flow of fuel through heat exchanger 108. In addition, engine operation may be adjusted. In certain embodiments, the system controls the amount of fuel system coking by adjusting the FOX control valve 124 to adjust the amount of fuel directed through the deoxygenation system 120 to vary the amount of oxygen in the fuel. Further, the controller 904 may adjust the operation of the fuel deoxygenation system 120 to vary the amount of oxygen in the fuel directed through the deoxygenation system. As seen in FIG. 8, as the temperature increases in deoxygenated fuel, the rate of coke formation increases at a much slower rate than when regular oxygenated fuel is being used in the system.

In certain embodiments, the process of controlling the amount of fuel system coking occurs in a gas turbine engine, specifically within a component within the fuel system 119 of a gas turbine engine. While any components within the fuel system 119 may be subject to coking, coking may affect certain components more than others. In particular, components with relatively small orifices may be more adversely affected by coking, as the small orifices can be constricted further, adversely affecting fuel flow and performance of such components. In particular, some examples of components within a gas turbine engine fuel system having small orifices include fuel nozzles, heat exchangers, torque motors, servo-valves in a fuel control, and fuel cooled electronics housings.

In certain embodiments, after step 340, the system returns to first step 310 and begins the process once again of determining and controlling the amount or rate of fuel system coking.

Figure 4:
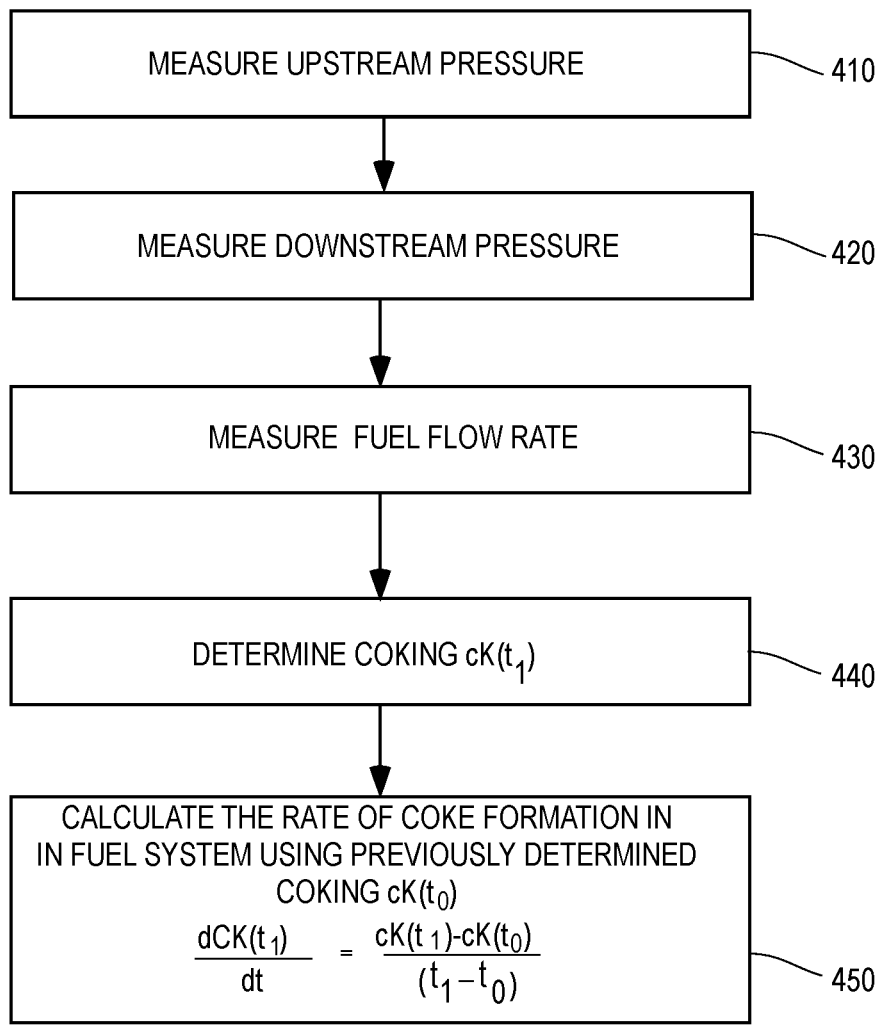
FIG. 4 is a flowchart of an exemplary process of determining the rate of fuel coke formation in a fuel system.

FIG. 4 is a flowchart of an exemplary process of determining the rate of coke formation in a fuel system. At first step 410, an upstream pressure in the fuel system 119 is measured. As discussed above, the upstream pressure could be measured using a first pressure sensor 132 located at any location of interest within the fuel system 119. At step 420, a downstream pressure in the fuel system 119 is measured. The pressure may be measured using a second pressure sensor 132 located downstream of the first pressure sensor 132 at any downstream location within the fuel system 119, such as downstream of one or more components, junctures, or legs of the fuel system 119. At step 430, the fuel flow rate is measured, such as by a fuel flow sensor 134. At step 440, the amount of coking $cK(t_1)$ between the first and second pressure sensors at the time of measurement, $t_1$, is determined by the controller 904. For example, the pressure drop between the first and second pressure sensors 132 at a known fuel flow rate may be compared with a previously determined pressure drop between the first and second pressure sensors 132 prior to the formation of coke in the fuel system 119 at a known fuel flow rate to determine the amount of coke in the fuel system 119, or a portion thereof, based on the coking deposits' effect on the pressure drop between the first and second pressure sensors. At step 450, the system controller 904 determines the rate of coke formation in the fuel system 119, which is equivalent to the change of coking in the system over a period of time from $t_0$ to $t_1$, which can be determined using the coking $cK(t_1)$ determined at time $t_1$ and a previously determined coking $cK(t_0)$ at time $t_0$, according to the following equation:

$$\frac{dCK(t_1)}{dt} = \frac{cK(t_1) - cK(t_0)}{t_1 - t_0}$$

Figure 5:
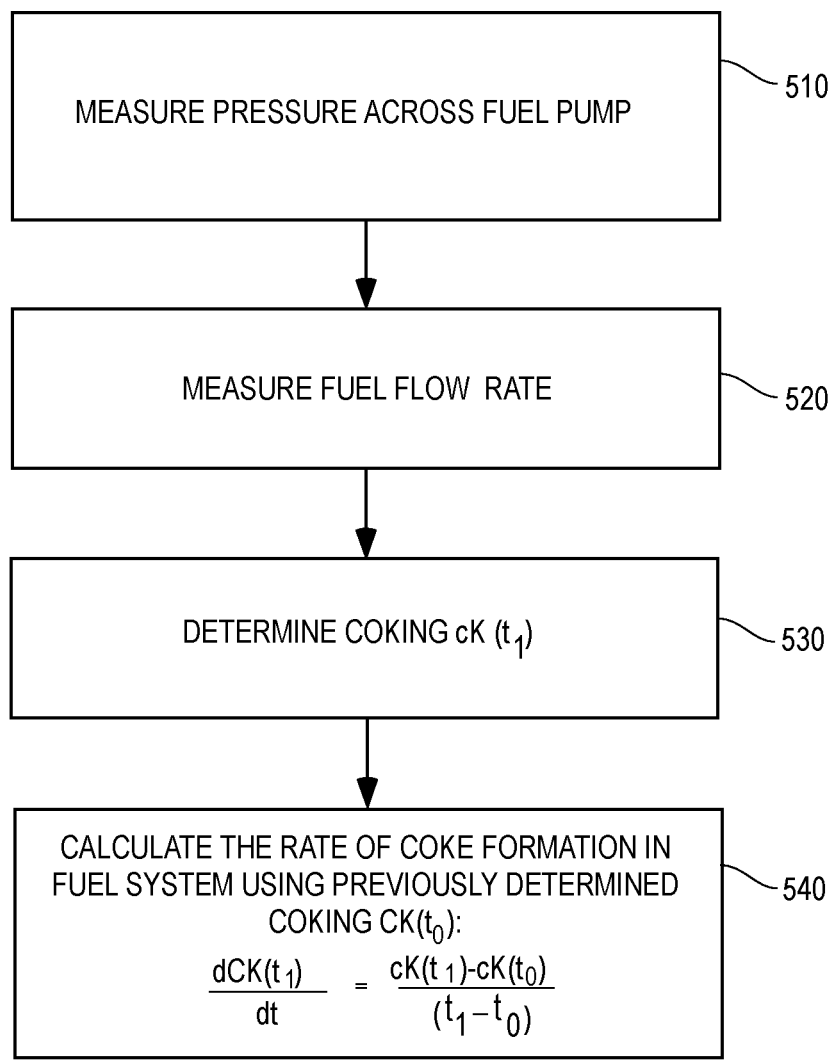
FIG. 5 is a flowchart of another exemplary process of determining the rate of fuel coke formation in a fuel system.

FIG. 5 is a flowchart of another exemplary process of determining the rate of fuel system coke formation. At first step 510, the pressure across the fuel pump is measured. At step 520, the fuel flow rate is measured, such as by fuel flow sensor 134. At step 530, the amount of coking $cK(t_1)$ in the fuel system at time $t_1$ is determined by the controller 904. For example, the differential pressure across the fuel pump at a known fuel flow rate may be compared with a previously determined differential pressure across the fuel pump prior to the formation of coke in the fuel system at a known fuel flow rate to determine the amount of coke in the fuel system based on the coking deposits' effect on the differential pressure. At step 540, the system controller 904 determines the rate of coke formation in the fuel system 119, which is equivalent to the change of coking in the system over a period of time from $t_0$ to $t_1$, which can be determined using the coking $cK(t_1)$ determined at time $t_1$ and a previously determined coking $cK(t_0)$ at time $t_0$, according to the following equation:

$$\frac{dCK(t_1)}{dt} = \frac{cK(t_1) - cK(t_0)}{t_1 - t_0}$$

In certain embodiments, the controller 904 may control the controllable elements of the thermal transport bus 102 and/or the fuel system 119 to adjust the fuel temperature or level of deoxygenation of the fuel to adjust the coking formation rate in the fuel system 119 in accordance with a schedule, such as a scheduled maintenance event in which fuel system coking deposits will be removed. For example, the controller 904 may take into consideration the length of time until the next scheduled maintenance event. The fuel temperature may be maintained at or below a particular temperature to ensure that fuel system coking will not exceed a threshold level before a scheduled maintenance event, which may also take into account other parameters, including the engine power level and the expected operating time of the engine. The controller 904 may also be operable to initiate an automated coking removal process or cleaning cycle upon reaching a predetermined fuel system coking threshold to reduce the amount of coke deposits in the fuel system 119. In addition, the controller 904 may provide an indication that maintenance is needed, such as via an alert within the cockpit of an aircraft and/or to an engine monitoring system or a remote monitoring system.

Figure 6:
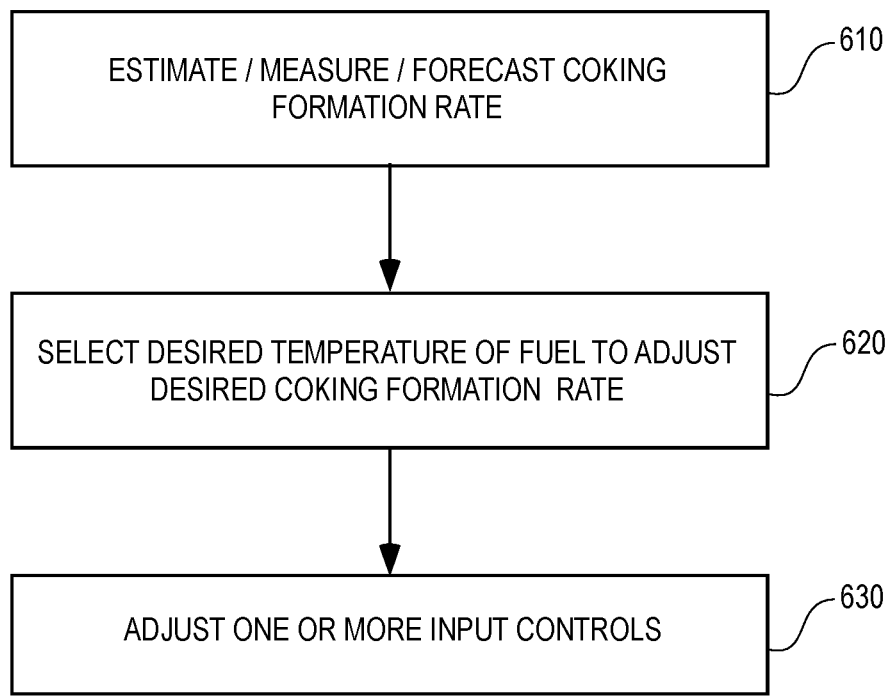
FIG. 6 is a flowchart of an exemplary process of controlling the rate of fuel coke formation using input controls to adjust the fuel temperature in a gas turbine engine.

FIG. 6 is a flowchart of an exemplary process of controlling the rate of fuel coke formation using input controls in a gas turbine engine to adjust the temperature of the fuel in the fuel system 119. At first step 610, the system determines or estimates the coking formation rate as seen in FIG. 4 or 5. At step 620, the system selects the desired temperature of the fuel HX working fluid to adjust the fuel temperature to obtain the desired coking rate. At step 630, available input controls are used to adjust the fuel HX working fluid temperature. The input controls may include at least one of speed of pump 104, engine bleed air bypass 100 via control valve 105, fuel/working fluid HX bypass 130 via control valve 128, fuel/working fluid HX bypass 110 via control valve 116, and normal bypass systems.

Figure 7:
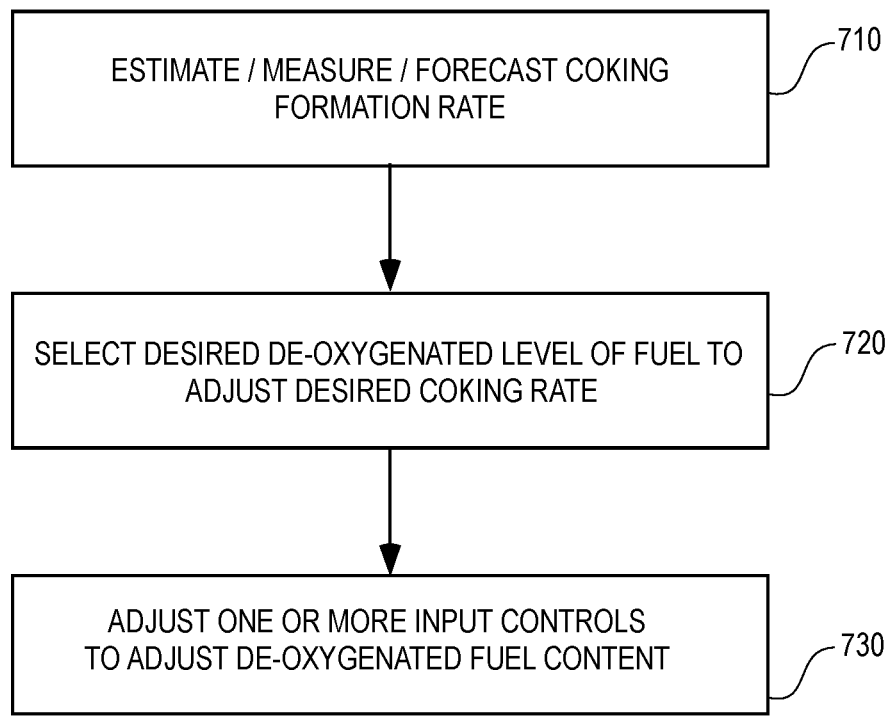
FIG. 7 is a flowchart of an exemplary process of controlling the rate of fuel coke formation by adjusting the level of deoxygenated fuel in the fuel system.

FIG. 7 is a flowchart of another exemplary process of controlling the rate of fuel coke formation. At first step 710, the system via controller 904 determines or estimates the coking formation rate, such as using one of the methods described above. At step 720, the system selects the desired deoxygenated level of fuel to adjust the desired coking rate based upon the determination or estimation in first step 710. As seen in FIG. 8, as the temperature of oxygenated fuel rises, the rate of fuel coke formation is significantly higher compared to deoxygenated fuel. At step 730, through the use of available input controls, the system via controller 904 adjusts the deoxygenated fuel content supplied in order to control the rate of fuel coke formation in the fuel system 119. In certain embodiments, the available input controls include the operation of the fuel deoxygenation system 120 to vary the amount of oxygen removed from the fuel by the fuel deoxygenation system 120 and a fuel deoxygenation system bypass 122, through which fuel flow may be directed by FOX control valve 124.

FIG. 8 is a graph illustrating the fuel coke formation rate as function of temperature. The solid black line in the graph represents the fuel coke formation or deposition rate for regular oxygenated fuel, wherein autoxidation occurs in the fuel system 119 until the fuel temperature reaches approximately 780° F., as indicated by the vertical dashed line. The curve shown in a dashed black line in the graph represents the fuel coke formation rate for deoxygenated fuel. As seen in the graph, from roughly 350° F. to roughly 600° F., the rate of fuel coke formation rapidly increases when the fuel is not deoxygenated. When the system significantly reduces the amount of oxygen in the fuel, the rate of fuel coke formation is substantially less. At the convergence of the solid and dashed lines, all of the oxygen has been consumed by the system, and the system goes into pyrolysis. Thus, the rate of fuel coking in the fuel system may be reduced by keeping the fuel temperature in the lower (or higher) part of the temperature range and/or deoxygenating the fuel.

Figure 9:
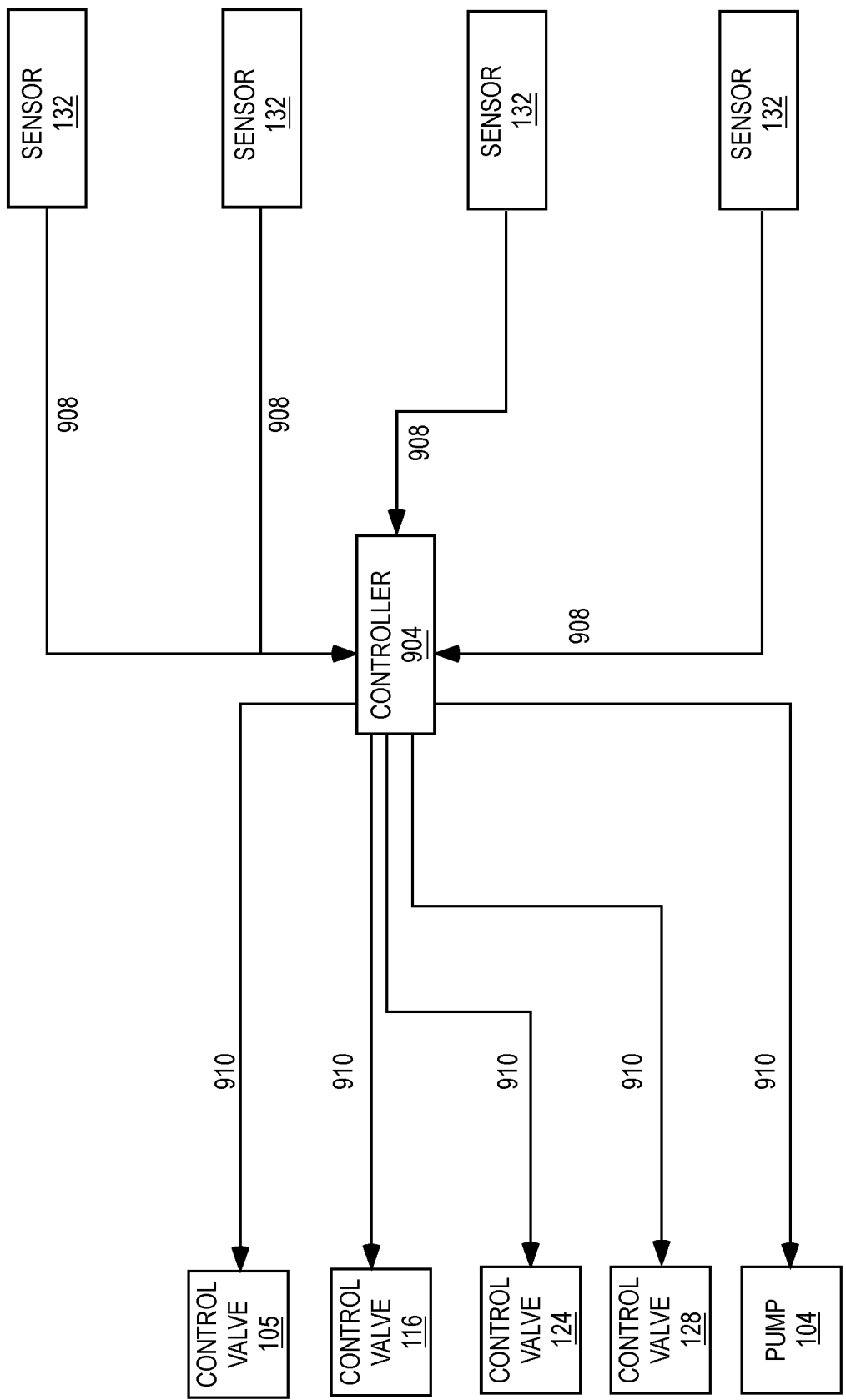
FIG. 9 is a simplified diagram of an exemplary embodiment of a fuel coke control system.

As shown in FIG. 9, a system for estimating or determining an amount or rate of coke formation in a fuel system and controlling the rate of fuel coke formation may include one or more sensors 132, a controller 904, and the controllable components of the fuel system 119 and thermal transport bus 102, such as control valves 105, 116, 124, 128, and pump 104. The controller 904 may also be operable to control operation of the turbine engine to adjust the rate of coke formation in the fuel system 119. Each sensor 132 measures one or more of the operating parameters associated with the amount or rate of fuel coke formation in the fuel system 119. The sensors 132 may comprise, for example, any combination of fuel sensors, optical or position sensors, pressure sensors, flow sensors, temperature sensors, and other sensors commonly associated with combustor and/or gas turbine operations, the fuel system 119 and the thermal transport bus 102 thereof. Each sensor 132 generates one or more signals 908 corresponding to the operating parameter being monitored, such as pressure, temperature, flow, or coke layer thickness, which in turn indicates or can be used by the controller 904 to determine the coke formation deposit rate or accumulated coke formation in the fuel system 119, or a particular portion thereof. The controller 904 is communicatively connected with the one or more sensors 132 to receive the signals 908 generated by the sensors 132. The controller 904 processes the signal(s) 908 to determine a level of coking in the fuel system 119 or a portion thereof and/or the coking formation rate therein in accordance with one or more of the methods disclosed herein and generates one or more control signals 910 which are operable to control one or more of the controllable inputs of the turbine engine 10, the fuel system 119 and/or thermal transport bus 102, as discussed above. As used herein, the controller 904 may comprise any combination of microprocessors, circuitry, or other programmed logic circuit and is not limited to any particular hardware architecture or configuration. In one form, the controller is, or is in operable communication with, an electronic engine controller, such as a Full Authority Digital Engine Control (FADEC).

As discussed above, the systems and methods described herein allow estimation or determination of the amount and/or rate of fuel system coking. The system can compare the estimated or determined amount or rate of fuel system coking with a desired target level or range and regulate the rate of coke formation in the fuel system to keep the rate or amount of coke formation below the target level or within an acceptable range. By controlling the rate of coke formation, it is possible to increase the length of service intervals or meet pre-determined service intervals. In addition, the system can use the determined amount and rate of fuel system coking to determine or predict the need for maintenance and provide a user notification of an impending need for service so that service may be scheduled at an appropriate and convenient time. In addition, the system may be operable to trigger an automated fuel system cleaning routine when a predetermined coking deposit threshold is reached.

Generally speaking, the various aspects of the present disclosure can be employed by the subject matter of the following clauses:

A system for controlling a rate of fuel coke formation in a fuel system of a turbine engine, the system including at least one sensor configured to measure an operating parameter associated with coke formation in the fuel system, wherein the at least one sensor generates a signal representative of the operating parameter, and a controller operably connected with the at least one sensor for receiving the signal therefrom, wherein the controller is configured to determine at least one of a rate of fuel coke formation in the fuel system and an amount of fuel coke formation in the fuel system based at least in part on the operating parameter, wherein the controller generates a control signal for controlling at least one of the turbine engine, a thermal management system of the turbine engine and the fuel system to adjust the rate of fuel coke formation in the fuel system.

The system of the proceeding clause may further include that the controller is configured to adjust the rate of fuel coke formation in the fuel system to keep the rate of fuel coke formation or the amount of fuel coke formation in the fuel system at or below a predetermined level.

The system of one or more of the preceding clauses may further include that the controller is configured to control the thermal management system to adjust a temperature of a fuel in the fuel system to adjust the rate of fuel coke formation in the fuel system.

The system of one or more of the preceding clauses may further include that the control signal generated by the controller is operable to control at least one of a speed of a pump of the thermal management system, a control valve in fluidic communication with an engine bleed air bypass, a control valve in fluidic communication with a fuel heat exchanger bypass, a control valve in fluidic communication with a fuel deoxygenation system bypass.

The system of one or more of the preceding clauses may further include that the at least one sensor is a fuel flow sensor.

The system of one or more of the preceding clauses may further include that the at least one sensor is an optical sensor of the fuel system.

The system of one or more of the preceding clauses may further include that the controller is configured to generate a signal operable to initiate an automated coking removal process or provide an indication that maintenance is needed.

The system of one or more of the preceding clauses may further include that the at least one sensor is a fuel pressure sensor.

The system of one or more of the preceding clauses may further include that the controller is configured to control an oxygenation level of a fuel in the fuel system to adjust the rate of fuel coke formation in the fuel system.

There is further provided a method for controlling a rate of fuel coke formation in a fuel system of a turbine engine, including measuring a parameter associated with fuel coking in the fuel system, estimating or determining an amount or a rate of fuel system coking in the fuel system based at least in part on the parameter, comparing the amount or rate of fuel system coking with a predetermined amount or rate of fuel system coking, and adjusting the rate of fuel coke formation in the fuel system based on the comparison of the amount or rate of fuel system coking and the predetermined amount or rate of fuel system coking.

The method of the preceding clause may further include adjusting the rate of fuel coke formation in the fuel system comprises controlling a thermal management system to adjust a temperature of a fuel in the fuel system.

The method of one or more of the preceding clauses may further include that adjusting the rate of fuel coke formation in the fuel system comprises adjusting an oxygenation level of a fuel with a deoxygenation system of the fuel system.

The method of one or more of the preceding clauses may further include adjusting the rate of fuel coke formation in the fuel system based on a length of time until a predetermined maintenance event.

The method of one or more of the preceding clauses may further include that measuring a parameter associated with fuel coking in the fuel system comprises measuring a pressure drop across the fuel system or a portion thereof.

The method of one or more of the preceding clauses may further include that measuring a parameter associated with fuel coking the fuel system comprises optically detecting a presence of a fuel coke deposit in the fuel system.

The method of one or more of the preceding clauses may further include that adjusting the rate of fuel coke formation in the fuel system comprises adjusting at least one of a speed of a pump of a thermal management system, a control valve in fluidic communication with an engine bleed air bypass, a control valve in fluidic communication with a fuel heat exchanger bypass, and a control valve in fluidic communication with a fuel deoxygenation system bypass.

There is further provided a system for controlling a rate of fuel coke formation in a fuel system of a turbine engine, including a controller configured to determine whether one or more parameters of the fuel system are indicative of a rate of fuel coke formation or an amount of fuel coke formation in the fuel system being above a target level, the controller configured to adjust an operation of a thermal management system of the turbine engine and the fuel system to adjust the rate of fuel coke formation in the fuel system when the rate of fuel coke formation or an amount of fuel coke formation in the fuel system is above the target level.

The system of the preceding clause may further include that the controller is configured to adjust an oxygenation level of a fuel in the fuel system to adjust the rate of fuel coke formation in the fuel system.

The system of one or more of the preceding clauses may further include that the target level is determined by the controller based on a length of time until a predetermined maintenance event.

The system of one or more of the preceding clauses may further include that the controller is configured to adjust a temperature of a fuel in the fuel system.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A system for controlling a rate of fuel coke formation in a fuel system of a turbine engine, the system comprising:
    at least one sensor configured to measure an operating parameter of the fuel system at a first time, the operating parameter being associated with coke formation in the fuel system, wherein the at least one sensor generates a signal representative of the operating parameter; and
    a controller operably connected with the at least one sensor for receiving the signal therefrom, wherein the controller is configured to determine a first amount of fuel coke formation for the fuel system using the signal representative of the operating parameter,
    wherein the controller determines a current value for a rate of fuel coke formation in the fuel system by comparing the first amount of fuel coke formation to a second amount of coke formation for the fuel system, the second amount of coke formation being determined by the controller at a second time prior to the first time,
    wherein the controller identifies a next scheduled maintenance event and a target amount of coke formation,
    wherein, when the current value for the rate of fuel coke formation projects increases to the first amount of fuel coke formation that will exceed the target amount of coke formation before the next scheduled maintenance event, the controller generates a control signal for controlling the turbine engine, a thermal management system of the turbine engine, and/or the fuel system to adjust the rate of fuel coke formation in the fuel system to a new value that projects increases to the first amount of fuel coke formation that do not exceed the target amount of coke formation before the next scheduled maintenance event.

2. The system of claim 1, wherein the control signal controls the thermal management system to adjust a temperature of a fuel in the fuel system to adjust the rate of fuel coke formation in the fuel system to the new value.

3. The system of claim 1, wherein the control signal generated by the controller is operable to control at least one of a speed of a pump of the thermal management system, a control valve in fluidic communication with an engine bleed air bypass, a control valve in fluidic communication with a fuel heat exchanger bypass, or a control valve in fluidic communication with a fuel deoxygenation system bypass.

4. The system of claim 1, wherein, the at least one sensor is a fuel flow sensor.

5. The system of claim 1, wherein the at least one sensor is an optical sensor of the fuel system.

6. The system of claim 1, wherein the controller is configured to generate a signal operable to initiate an automated coking removal process or provide an indication that maintenance is needed.

7. The system of claim 1, wherein the at least one sensor is a fuel pressure sensor.

8. The system of claim 1, wherein the control signal controls an oxygenation level of a fuel in the fuel system to adjust the rate of fuel coke formation in the fuel system.

9. A method for controlling a rate of fuel coke formation in a fuel system of a turbine engine, comprising:
    measuring an operating parameter of the fuel system at a first time, the operating parameter being associated with fuel coking in the fuel system;
    determining a first amount of fuel coke formation for the fuel system using a signal representative of the operating parameter;
    determining a current value for a rate of fuel coke formation in the fuel system by comparing the first amount of fuel coke formation to a second amount of coke formation for the fuel system, the second amount of coke formation being determined at a second time prior to the first time;
    identifying a next scheduled maintenance event and a target amount of coke formation; and
    adjusting the rate of fuel coke formation in the fuel system to a new value when the current value for the rate of fuel coke formation projects increases to the first amount of fuel coke formation that will exceed the target amount of coke formation before the next scheduled maintenance event, wherein the new value for the rate of coke formation projects increases to the first amount of fuel coke formation that do not exceed the target amount of coke formation before the next scheduled maintenance event.

10. The method of claim 9, wherein adjusting the rate of fuel coke formation in the fuel system to the new value comprises controlling a thermal management system to adjust a temperature of a fuel in the fuel system.

11. The method of claim 9, wherein adjusting the rate of fuel coke formation in the fuel system comprises adjusting an oxygenation level of a fuel with a deoxygenation system of the fuel system.

12. The method of claim 9, wherein measuring the operating parameter associated with fuel coking in the fuel system comprises measuring a pressure drop across the fuel system or a portion thereof.

13. The method of claim 9, wherein measuring the parameter associated with fuel coking the fuel system comprises optically detecting a presence of a fuel coke deposit in the fuel system.

14. The method of claim 9, wherein adjusting the rate of fuel coke formation in the fuel system comprises adjusting at least one of a speed of a pump of a thermal management system, a control valve in fluidic communication with an engine bleed air bypass, a control valve in fluidic communication with a fuel heat exchanger bypass, or a control valve in fluidic communication with a fuel deoxygenation system bypass.

15. A system for controlling a rate of fuel coke formation in a fuel system of a turbine engine, comprising:
a controller configured to determine whether one or more parameters of the fuel system are indicative of a rate of fuel coke formation that projects an amount of fuel coke formation in the fuel system to be above a target level at a time before a next scheduled maintenance event, the controller configured to adjust an operation of a thermal management system of the turbine engine and the fuel system to adjust the rate of fuel coke formation in the fuel system to a new value that projects the amount of fuel coke formation to not exceed the target level before the next scheduled maintenance event.

16. The system of claim 15, wherein the controller is configured to adjust an oxygenation level of a fuel in the fuel system to adjust the rate of fuel coke formation in the fuel system to the new value.

17. The system of claim 15, wherein the controller is configured to adjust a temperature of a fuel in the fuel system to adjust the rate of fuel coke formation in the fuel system to the new value.

* * * * *